Sept. 2, 1941.　　　　J. H. STARR　　　　2,254,400
CONCENTRATION TESTING SYSTEM AND METHOD
Filed Jan. 26, 1940
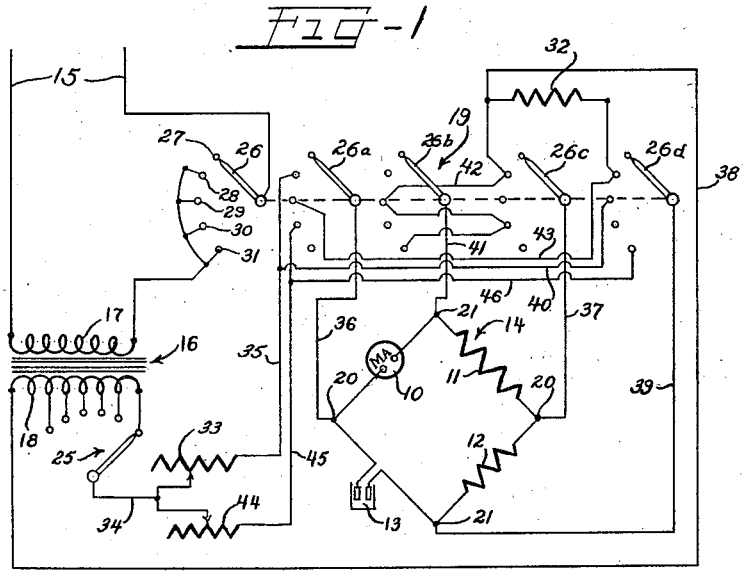
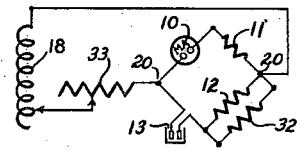
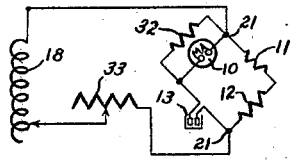
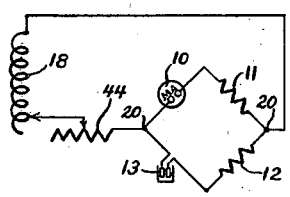
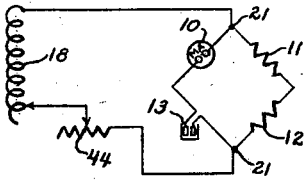
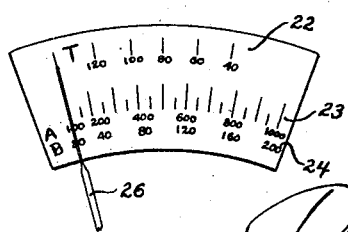
Inventor
James Hammond Starr Patented Sept. 2, 1941

2,254,400

UNITED STATES PATENT OFFICE 2,254,400

CONCENTRATION TESTING SYSTEM AND METHOD

James Hammond Starr, La Grange, Ill., assignor to Dearborn Chemical Co., Chicago, Ill., a corporation of Illinois Application January 26, 1940, Serial No. 315,683

25 Claims. (Cl. 175—183)

The present invention relates in general to a novel apparatus and method for measuring the electric conductivity of fluids, usually liquids for determining the concentration of impurities or other substances therein, or to indicate the electric conductivity of the fluid for any other purpose.

More specifically, the invention finds particular use for indicating the solid contents in a stream or body of water or may be utilized to indicate the presence of foreign matter in condensed steam, boiler waters, etc.

Heretofore, it has been the usual practice in conductivity testing instruments to provide a variable potential source that may be connected to a circuit containing a current responsive indicating instrument having a temperature scale and one or more conductivity scales, which may be selectively connected in series either with a calibrating impedance in the form of a resistance or a plurality of electrodes arranged to be immersed in the liquid to be tested. With the calibrating impedance in the circuit, the potential is adjusted to a value that will give a temperature reading on the indicating instrument corresponding to the temperature of the fluid to be tested. By means of suitable switches in the circuit, the calibrating impedance is electrically removed from the circuit and rendered inoperative, and the testing electrodes inserted in series with the instrument. The instrument then indicates on its conductivity scale the conductivity or concentration of the fluid.

Systems of the above type utilizing switching means for selectively varying the elements contained in circuit with the indicating instrument are subject to error, since the elements which are changed in the circuit may have different resistance or impedance characteristics. In other words, the constants of the circuit when calibrating the instrument with the calibrating impedance in the circuit may differ appreciably from the circuit constants when the electrodes are in the circuit with the instrument.

Such errors have been found to occur in such systems particularly where the concentration or conductivity of the fluid is such as to give readings near the ends of the instrument scales. Such errors occur, for example, where the calibrating impedance is selected to give a proper reading near the mid-point of the concentrate scale. Then, if the concentration of the fluid is such as to fall near the ends of the concentration scales of the instrument, the total current drain may be substantially greater or less than that of the calibrating impedance alone, with consequent variation in voltage applied to the fluid sample. These readings due to the variance between the circuit characteristics during the calibration operation and the conductivity or concentration testing operation may be considerably in error.

With the above inherent objections to the present arrangements for determining conductivity and concentration of a fluid, the present invention contemplates as a primary object the provision of an improved system wherein errors will be substantially, if not entirely, eliminated and the final results obtained more accurately.

A further object of the invention is to provide an improved system in which the various elements are contained in a closed network so as to eliminate from the calibrating and testing circuits the variable resistance of switch contacts and errors resulting therefrom.

A still further object of the herein described invention is to provide improved apparatus for conductivity measuring purposes, which is so arranged that the elements are in circuit at all times, all the elements being connected and energized during both the calibrating and concentration determining steps of the testing procedure.

Still another object of the invention is to provide a novel method for testing the conductivity and concentration of a fluid.

Other objects and features of the invention will more fully appear from the following detailed description taken in connection with the accompanying drawing which illustrates a single embodiment thereof, and in which:

Figure 1 is a view schematically illustrating the electrical connections between the various parts and the relationship thereof comprising the present invention;

Figures 2 to 5 inclusive illustrate various circuit setups to meet different conditions of operation; and Figure 6 is a face view of a dial for use in connection with indicating means such as utilized in the present invention.

As shown on the drawing:

With reference to Figure 1, there are provided current responsive indicating means 10, calibrating means 11, a facsimile impedance 12 and a plurality of electrodes 13, all of which are connected so as to define the elements of a four terminal network, generally indicated at 14.

The network is connected with a suitable potential source 15, which may constitute the usual 110 volt lighting circuit, through a step-down transformer 16 having a primary winding 17 and a tapped secondary winding 18 adjustable to supply approximately fourteen to forty volts on the network circuit.

A gang switch 19 is provided for setting up the circuit connections and varying the points at which voltage is applied to the network.

In one position of the switch 19, voltage is applied at one set of alternate junctions of the network arms, as shown at 20—20, and in another position the potential is applied at the other set of junctions of the arms of the network, as shown at 21—21.

It will be noted that the network forms a closed circuit devoid of switching devices in which the switch contacts might provide a variable contact resistance which would vary the network characteristics and cause errors in the test results. It will be noted that, when the potential is applied at points 20—20 on the network, the indicating instrument 10 is in series with the calibrating impedance 11 in a circuit which is in parallel relation with a circuit containing the electrodes 13 and the facsimile impedance 12. Moreover, when the potential is applied at points 21—21, the indicating means 10 is in series with the electrodes 13 in a circuit which is in parallel relation with a circuit containing the calibrating impedance 11 in series with the facsimile resistance.

The indicating means is in the form of an ammeter of substantially 1/16 ampere capacity having an impedance or resistance of substantially 15 ohms. The facsimile resistance is chosen to have a corresponding impedance, in this instance 15 ohms, and is placed in a circuit in parallel relation with the circuit containing the indicating means.

The calibrating means comprises a resistance of approximately 500 ohms, this resistance being so chosen as to cause a current to flow through the ammeter in series therewith, the magnitude of this current as indicated on a temperature scale being an expression of the temperature conductivity characteristic of the fluid to be tested.

It will be noted that when the potential is connected to the points 20—20 of the network, two parallel circuits are formed, and that the ammeter measures the current flowing through the calibrating resistance. Since the other parallel circuit contains the facsimile resistance and the electrodes 13 which are immersed in the fluid to be tested, the ammeter measures the potential impressed across the facsimile resistance and electrodes in series. On the other hand, when the connections to the network are at points 21—21, the calibrating impedance and the electrodes are transposed relative to the parallel circuits and the ammeter is then in series with the electrodes and is responsive to the current flowing therethrough. When thus connected, the facsimile resistance is in series with the calibrating resistance in the other parallel circuit. It will be appreciated by those skilled in the art that irrespective of whether the potential is applied at points 20—20 or 21—21 the total resistance of the four terminal network between the points of potential application will be the same.

For convenience in carrying out the tests, the ammeter is provided with a dial as shown in Figure 6. This dial is provided with a plurality of scales, one of these scales as indicated at 22 being marked with a T for indicating the ammeter current in terms of temperature. Additional scales A and B as repectively shown at 23 and 24 indicate the current in terms of conductivity or concentration in the fluid. For convenience in making the tests, the two latter scales are in the ratio of 5 to 1.

In general, the testing procedure is to manipulate the switch 19 to the proper contacts to connect the transformer secondary potential to the points 20—20 of the network. The applied potential is then regulated by a tap changing switch 25 and the rheostats 33 or 44 until the indicating hand 26 of the ammeter will read a value on the temperature scale 22 corresponding to the temperature of the fluid to be tested. The switch 19 is then operated to connect the potential to points 21—21 of the network, whereupon the concentration of the fluid being tested is indicated on one or the other of the concentration scales 23 or 24.

The various connections for adapting the invention for the more convenient testing of fluids having high or low concentration will now be explained.

The switch 19 is illustrated as comprising five movable arms 26, 26$^a$, 26$^b$, 26$^c$, and 26$^d$ which are connected for gang movement in each case to positions in connection with stationary contacts 27 to 31 inclusive, the position in connection with contacts 27 constituting the off position of the switch.

If the fluid to be tested has a high concentration, the arms of the switch 19 are moved to their respective contact points 28. This operation of the switch 19 connects a shunt resistance 32 across the facsimile impedance 12, and connects the potential to the network at point 20—20, the potential supply circuit containing an adjustable rheostat 33. The resistance of the shunt is approximately 4.00 ohms and the rheostat resistance is preferably approximately 20 ohms. This circuit is shown in a simplified manner in Figure 2. The circuit may be traced in Figure 1 as follows:

From one side of the secondary winding 18 of the transformer, through the contacts of switch 25, conductor 34, rheostat 33, conductor 35, switch contact 28 and switch arm 26$^a$, conductor 36 to one connection point 20 of the network, through parallel circuits of the network respectively containing the ammeter and calibrating impedance in series, and the electrodes and facsimile resistance in series, from the other point 20 of the network through conductor 37, switch arm 26$^c$ and contact 28, and through conductor 38 back to the other side of the transformer secondary. It will be noted that the shunt resistance 32 is connected across the facsimile resistance and parallel therewith through the following circuit: From one point 20 of the network, through conductor 37, switch arm 26$^c$ and contact 28 associated therewith, conductor 38, through the shunt 32, contact 28 associated with switch arm 26$^d$, and thence through conductor 39 to the connection point 21 on the network lying on the other side of the facsimile resistance 12.

The tap changing switch 25 and rheostat 33 are now adjusted to regulate the potential applied to the network by varying the current flow through the ammeter until the hand indicates a temperature on the temperature scale corresponding to the temperature of the fluid being tested.

Having thus adjusted the potential, the switch 19 is moved to its next point into engagement with the respective contacts 29 which sets up the arrangement shown in simplified form in Figure 3, wherein it will be noted that the shunt 32 has been shifted so as to connect across the ammeter rather than the facsimile resistance, and the points of application of potential to the network have been shifted from 20—20 to 21—21 to place the ammeter in the parallel circuit containing the electrodes. As more specifically shown in Figure 1, this circuit comprises the following connection: From one side of the secondary of the transformer through the contacts of switch 25, conductor 34, rheostat 33, conductor 35, conductor 40, contact 29 associated with switch arm 26$^b$, conductor 39, through parallel circuits of the network respectively containing the ammeter 10 in series with the electrodes 13 and the facsimile resistance in series with the calibrating impedance, conductor 41, switch arm 26$^b$ and associated contact 29, conductor 42, and thence through conductor 38 to the other side of the transformer secondary. It will be noted that in this connection the shunt 32 is now connected in parallel across the ammeter 10 through the following circuit: From one potential connection point of the network, through conductor 41, switch arm 26$^b$ and associated contact 29, conductor 42, through the shunt 32, conductor 43, through contact 29 and associated switch arm 26$^a$, and thence through conductor 36 to potential application point 20 of the network on the opposite side of the ammeter.

The conductivity of the fluid is now read on scale A of the indicating instrument.

Where it is desired to measure the concentration of fluids of low concentration, the switch 19 is actuated first to the contacts 30 which sets up the circuit arrangement shown in simplified form in Figure 4. In this arrangement, it will be noted that a rheostat 44 of substantially 100 ohms resistance is placed in the potential supply circuit to the network, and the shunt 32 is eliminated. More specifically, the connections as shown in Figure 1 are through the following circuit:

From one side of the transformer secondary, through the contacts of switch 25, conductor 34, rheostat 44, conductor 45, the contact 30, associated with switch arm 26$^a$, conductor 36 to one connection point 20 of the network, thence through parallel circuits respectively containing the indicating means 10 and calibrating impedance 11 in series and the electrodes 13 and facsimile resistance 12 in series, and the other point 20 of the network, through conductor 37, switch arm 26$^c$ and associated contact 30, conductor 42, thence through conductor 38 to the other side of the transformer secondary. This connection enables the adjustment of the voltage as applied to the network in accordance with the temperature of the fluid to be tested.

The final testing operation is then made by changing the switch 19 so that the switch arms engage the contacts 31 thereof. This operation as shown in simplified form in Figure 5 operates to connect the voltage to the points 21—21 on the network. As more specifically shown in Figure 1, the circuit is as follows: From one side of the transformer secondary through the contacts of switch 25, conductor 34, rheostat 44, conductor 45, conductor 46, contact 31 associated with switch arm 26$^d$, thence through conductor 39 to one of the points 21 of the network, through parallel circuits respectively containing the indicating means in series with the electrodes and the facsimile resistance in series with the calibrating impedance, from the other point 21 of the network through conductor 41, switch arm 26$^b$ and associated contact 31, conductor 42, and thence through conductor 38 back to the other side of the transformer secondary. The concentration is then determined by reading on scale B of the instrument dial.

With further reference to Figure 1, it will be seen that the switch arm 26 and associated contacts control the energization of the primary winding of the transformer.

From the foregoing description, it will be apparent that the present invention provides an improved apparatus and method for measuring the conductivity or concentration of a fluid, which will be substantially, if not entirely, free of errors and result in more accurate determination; a system in which the various elements are contained in a closed network so as to eliminate from the calibrating and testing circuit the variable resistance at switch contacts, etc.; which is so arranged that the elements are contained in parallel circuits at all times, all the elements being connected and energized during both the calibrating and concentration determining steps of the testing procedure; in which the calibrating impedance and electrodes are transposed or interchanged in parallel circuits without altering the total impedance of the parallel circuits; and which provides a novel method for carrying out the testing procedure.

It will be further apparent that, in consequence of the various improvements included in my invention, the total current supplied by a constant potential source to the apparatus, when adjusting for temperature of the sample, is identical in magnitude and relative phase position to that obtained when observing the conductivity or concentration of the sample. This equality is independent of the conductivity of the sample and is strictly true within the manufacturing tolerance of equality of the impedance of the meter coil to that of the facsimile impedance, which tolerance may be as small or great as commercial considerations and desired over-all accuracy may dictate.

Now it is, of course, to be understood that although I have described in detail the preferred embodiment of my invention, the invention is not to be thus limited but only insofar as defined by the scope and spirit of the appended claims.

I claim as my invention:

1. In a fluid conductivity testing device, a plurality of electrodes immersible in the fluid, a plurality of impedances, current responsive indicating means, said electrodes, impedances, and indicating means being connected in a network, a source of potential connected to points on the network for passing a current through the network, means for adjusting the potential to pass a current through the indicating means corresponding to the temperature of said fluid to be tested, and means for connecting the adjusted potential at different points of the network, said second points offering the same network impedance as said first points, for causing the indicating means to indicate a current passing through the electrodes corresponding to the conductivity of the fluid.

2. In a fluid conductivity testing device, a plurality of electrodes immersible in the fluid, a plurality of impedances, current responsive indicating means, said electrodes, impedances, and indicating means being connected in a network, a source of potential connected to points on the network for passing current through the network, means for adjusting the potential to pass a current through the indicating means corresponding to the temperature of said fluid to be tested, and means for connecting the adjusted potential at different points of the network for causing the indicating means to indicate a current passing through the electrodes corresponding to the conductivity of the fluid.

3. In a fluid conductivity testing device, a network having two pairs of terminals, one pair being connected to a potential source, said network containing current responsive indicating means, testing electrodes immersible in the fluid, and a plurality of impedances, means for adjusting said potential to vary the current through the indicating means in accordance with the temperature of the fluid to be tested, and means for transferring the potential source to the alternate pair of network terminals for indicating the current through the indicating means in accordance with the concentration in said fluid.

4. In a fluid conductivity testing device, a current responsive meter, a first impedance, a plurality of electrodes immersible in the fluid to be tested, and a second impedance, all of which are connected to form a four terminal network, a source of potential selectively connectable to alternate pairs of terminals of said network for disposing the electrodes and first impedance in parallel circuits in which one or the other thereof will include the meter.

5. In a fluid conductivity testing device, a current responsive meter, a first impedance, a plurality of electrodes immersible in the fluid to be tested, and a second impedance, all of which are connected to form a network having two pairs of terminals, a source of potential selectively connectable to either pair of network terminals for disposing the electrodes and first impedance in parallel circuits in which one or the other thereof will include the meter, the total impedance of the network as measured at each of the two pairs of terminals being equal.

6. In a fluid conductivity testing device, a current responsive meter, a first impedance, a plurality of electrodes immersible in the fluid to be tested, and a second impedance, all of which are connected to form a network having two pairs of terminals, a source of potential selectively connectable to either pair of network terminals for disposing the electrodes and first impedance in parallel circuits in which one or the other thereof will include the meter, and means for adjusting said potential when the first impedance is in the parallel circuit containing the meter.

7. In a fluid conductivity testing device, a current responsive meter, a first impedance, a plurality of electrodes immersible in the fluid to be tested, a second impedance, all of which are connected to form a network having two pairs of terminals, a source of potential selectively connectable to either pair of terminals for disposing the electrodes and first impedance in parallel circuits in which one or the other thereof will include the meter, and a shunt selectively connected in parallel with said second impedance and said meter in accordance with said disposition.

8. In a fluid conductivity testing device, a plurality of parallel circuits connected to a potential source, current responsive indicating means in one of said circuits and fluid immersible electrodes in another of said circuits, a plurality of impedances in said crcuits, means for adjusting the potential applied to said circuits to a predetermined value, and means for transposing the electrodes and certain of the impedances relative to said circuits, while maintaining the parallel impedances of the circuits substantially unchanged, for causing the indicating means to indicate the current flowing through the electrodes.

9. In a fluid conductivity testing device, a plurality of electrodes immersible in the fluid, a calibrating impedance, a facsimile impedance, indicating means arranged to indicate differences in conductivity of the fluid at different temperatures; said electrodes, impedances, and indicating means being connected to form a network; a source of potential for feeding parallel paths of the network respectively containing the indicating means and facsimile impedance, switch means for selectively transposing the electrodes and calibrating impedance in said parallel paths, and means for adjusting said potential source while the calibrating impedance is in the path containing the indicating means for varying the indicating means until it indicates the temperature of the liquid to be tested.

10. In a fluid conductivity testing device, a first circuit containing a current responsive indicating means and an impedance, a second circuit containing an impedance substantially the equivalent of the impedance of said indicating means and a pair of electrodes immersible in the fluid to be tested, said circuits being connected in parallel to a potential source, whereby the indicating means is responsive to the current flowing through the impedance in the first circuit, and means for interchanging the latter impedance and the electrodes, whereby the indicating means is responsive to the current flowing through the electrodes, said circuits having substantially the same parallel impedance irrespective of said interchange.

11. In a fluid conductivity testing device, a first circuit containing a current responsive indicating means and an impedance, a second circuit containing an impedance substantially the equivalent of the impedance of said indicating means and a pair of electrodes immersible in the fluid to be tested, said circuits being connected in parallel to a potential source, whereby the indicating means is responsive to the current flowing through the impedance in the first circuit, and means for interchanging the latter impedance and the electrodes, whereby the indicating means is responsive to the current flowing through the electrodes.

12. In a fluid conductivity testing device, a first circuit containing a current responsive meter and an impedance, a second circuit containing an impedance, a pair of electrodes immersible in the fluid to be tested, and a shunt around the latter impedance, said circuits being connected in parallel to a variable potential source, means for adjusting said potential to vary the current flowing in the first circuit to a predetermined value, and means for interchanging the impedance in the first circuit with the electrodes in the second circuit and connecting the shunt around said meter.

13. In a fluid conductivity testing device, a circuit including a potential source, a plurality of circuit elements, means for adjusting the current in one of said circuit elements to a value corresponding to the temperature of the fluid being tested; means for measuring the current in a second of said circuit elements corresponding to the conductivity of the fluid being tested; and means for maintaining the total current in said circuit constant in magnitude after completion of said adjustment.

14. In a fluid conductivity testing device, a circuit including a potential source, a plurality of circuit elements, means for adjusting the current in one of said circuit elements to a value corresponding to the temperature of the fluid being tested; means for measuring the current in a second of said circuit elements corresponding to the conductivity of the fluid being tested; and means for maintaining the total current in said circuit constant in relative phase position after completion of said adjustment.

15. In a fluid conductivity testing device, a circuit including a potential source and a current measuring instrument, a plurality of circuit elements, means including said instrument for adjustment of the current in one of said circuit elements to a value corresponding to the temperature of the fluid being tested, means including said instrument for measuring the current in a second of said circuit elements corresponding to the conductivity of the fluid being tested, and means for maintaining the total current constant after completion of said adjustment.

16. The method of testing the conductivity of a fluid which comprises the steps of comparing a current flow through a dimensioned specimen of the fluid with a current flow through an impedance of predetermined value, both current flows being responsive to one and the same potential difference which has been adjusted in conformance with the temperature of said specimen.

17. Means to test an electrolyte comprising in combination a calibration impedance, a meter, and electrodes, together with a switch and suitable connections between said switch and said parts to ensure current flow through the electrodes and impedance in parallel at all times, and through the meter and selectively through the impedance or the electrodes.

18. In an instrument of the class described, the combination with an indicating meter, a source of current supply having a delivered potential whose value varies with the loading of said source of current, and a calibrating impedance, and a set of electrodes, of connections and switching devices effective to place either said impedance or said electrodes in connection with said meter optionally, and means supplemental to said devices effective to artificially load said source of current supply to the same total load in either of said optional connection conditions, thereby to eliminate test errors due to differences of loading effect on said source of current supply.

19. In an instrument of the class described, the combination with an indicating meter, a source of current supply having a delivered potential whose value varies with the loading of said source of current, and a calibrating impedance, and a set of electrodes, of connections and switching devices effective to place either said impedance or said electrodes in connection with said meter optionally, together with means and connections in conjunction with the aforesaid devices constituting a current loading on said source of current always supplemental to the loading being optionally metered as aforesaid, whereby the total load on the source of current is the same for both of said optional conditions.

20. In an instrument of the class described having a meter, a calibrating impedance, a set of test electrodes, and a source of current supply for all said parts, and connections and switching devices effective to place either said impedance or said electrodes in connection with said meter optionally, said source of current supply having a delivered potential whose value varies with the loading of said source of current, of means effective automatically to maintain the same total loading of the said source of current supply under both of said optional conditions, thereby to avoid errors of test based on previous calibration conditions.

21. In an instrument of the class described having a meter, a calibrating impedance, a set of test electrodes, and a source of current supply for all said parts, and connections and switching devices effective to place either said impedance or said electrodes in connection with said meter optionally, said source of current supply having a delivered potential whose value varies with the loading of said source of current, of means effective to automatically maintain the same amount and power factor of loading on said source of current supply under both of said optional conditions, thereby to avoid errors of test based on comparative use of said meter under said optional conditions.

22. In an instrument of the class described, the combination with an indicating meter, a source of current supply having a delivered potential whose value varies with the loading of said source of current, and a calibrating and a set of test electrodes, of connections and switching devices effective to place either said impedance or said electrodes in connection with said meter optionally, together with means to automatically ensure the same loading of said source of current under both of said optional conditions, thereby to avoid errors of test based on calibrations effected by use of said devices.

23. In a fluid conductivity testing device, a circuit including a potential source, a plurality of circuit elements, and a current responsive indicating means; means including said indicating means for measuring the current in one of said circuit elements corresponding to the conductivity of the fluid being tested; means for shunting said indicating means to read on a selected scale thereof said current corresponding to the conductivity of the fluid being tested; means including said indicating means for initially adjusting the current of a second of said circuit elements to a value corresponding to the temperature of the fluid being tested; and means for maintaining constant the total current subsequent to said initial adjustment.

24. In a method of testing the conductivity of a fluid comprising comparing a current flow through a specimen of the fluid with a current flow through an impedance of predetermined value, the step comprising initially connecting said specimen in parallel with said impedance, applying a potential to said members connected in parallel, adjusting said potential to a value predetermined in accordance with the temperature of said fluid, and thereafter measuring the flow of current through said fluid while maintaining the adjusted potential applied to said members connected in parallel.

25. The method of testing the conductivity of a fluid which comprises connecting in series a current responsive meter and a calibrating impedance, connecting in another series a plurality of electrodes immersible in the fluid and a facsimile impedance, connecting the two series in parallel to form a network, applying a potential to the terminals of said series, adjusting the potential to cause predetermined current flow in the meter, and thereafter applying the adjusted potential to said network at points placing said meter in series with said electrodes and said calibrating impedance in series with said facsimile impedance while maintaining the total current delivered to said network at the same value as obtained at the completion of the potential adjustment.

JAMES HAMMOND STARR.